United States Patent [19]
Van Tol

[11] 4,255,738
[45] Mar. 10, 1981

[54] DEVICE FOR DETECTING UNWANTED SIGNAL COMBINATIONS OF TWO SIGNAL LAMPS IN TRAFFIC LIGHTS

[75] Inventor: Nicolaas Van Tol, Hilversum, Netherlands

[73] Assignee: U.S. Philips Corporation, New York, N.Y.

[21] Appl. No.: 969,524

[22] Filed: Dec. 14, 1978

[30] Foreign Application Priority Data

Jan. 2, 1978 [NL] Netherlands ........................ 7800004

[51] Int. Cl.[3] ........................ G08G 1/097; B60Q 9/00
[52] U.S. Cl. ........................................ 340/46; 340/642
[58] Field of Search .................. 340/46, 78, 641, 642, 340/81 R, 85; 250/551; 307/311

[56] References Cited

U.S. PATENT DOCUMENTS

| | | | |
|---|---|---|---|
| 3,786,414 | 1/1974 | Dressayre | 340/46 |
| 3,925,709 | 12/1975 | Mitchell | 307/311 |
| 3,995,173 | 11/1976 | Sibley | 250/551 |
| 4,015,150 | 3/1977 | Jones | 307/311 |
| 4,135,145 | 1/1979 | Eberle | 340/46 |

OTHER PUBLICATIONS

*IBM Technical Disclosure Bulletin,* vol. 18, No. 11, Apr. 1976, p. 3545, Bingham, D. G. and Robertson, R. C., "Current Sensor".

*Primary Examiner*—James J. Groody
*Attorney, Agent, or Firm*—Thomas A. Briody; William J. Streeter; Bernard Franzblau

[57] ABSTRACT

Apparatus for preventing the simultaneous energization of a pair of traffic lights includes a detection device for monitoring any leakage current in the cables between the traffic lights and a control box. A threshold voltage related to a predetermined level of leakage current to be monitored is coupled to the detection device which actuates an alarm if the leakage current across at least one traffic light exceeds said predetermined level of leakage current.

10 Claims, 1 Drawing Figure

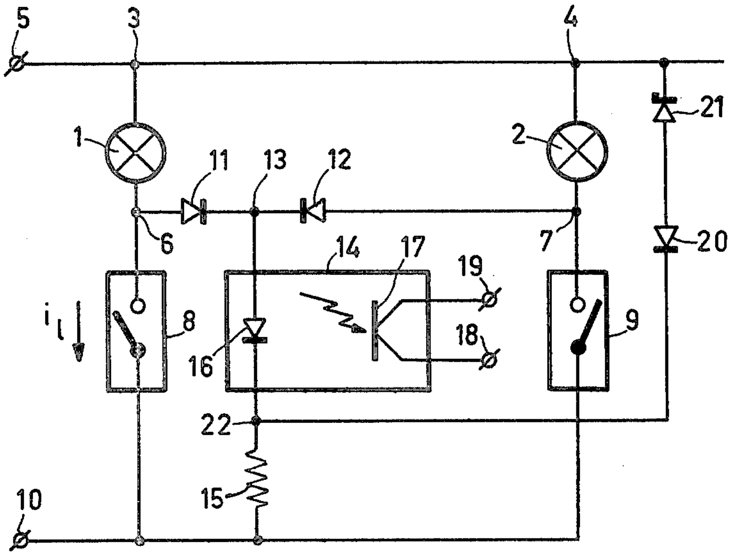
5
3
4
1
2
11
13
12
21
6
7
20
14
17
19
i_l
8
9
16
18
22
15
10

DEVICE FOR DETECTING UNWANTED SIGNAL COMBINATIONS OF TWO SIGNAL LAMPS IN TRAFFIC LIGHTS

The invention relates to a device for detecting unwanted signal combinations of two signal lamps in a system of traffic lights, each signal lamp being connected via a first terminal to a first connecting terminal of a supply source and via a second terminal and an individual switch to a second connecting terminal of the supply source. The device further comprises two oppositely arranged and series-arranged diodes connected between the second terminals and a detection device connected to the interconnected terminals of the diodes and to the second connecting terminal of the supply source.

Such a device is disclosed in German published application No. 1,808,871. The device described there not only monitors a mutually excluding signal state occurring between two signal states, but inter alia also a cut in the supply voltage owing to breaking or short-circuiting of the supply conductors, the occurrence of a short-circuit in the switches or a defective signal lamp.

However, this device is less suitable for monitoring leakage in the cables between the signal lamps and the switch box containing the switching equipment for controlling the signal lamp.

It is an object of the invention to render the device defined in the preamble more suitable for monitoring any leakage in the cables between the signal lamps and the switch box and thereby increase the reliability.

The device according to the invention is therefore characterized in that the detection device is connected via a bias voltage source to the second connecting terminal of the supply source.

A particularly advantageous solution is obtained where the bias voltage source comprises a voltage divider provided between the connecting terminals of the supply source, the voltage divider comprising a diode arranged in the same pass direction as the above-mentioned diodes and the detection device being connected to a tap point on the voltage divider.

A threshold voltage which unambiguously depends on the supply voltage is obtained because the voltage divider comprises a Zener diode arranged between the tap point and the first connecting terminal of the supply source with a pass direction opposite to that of the diode included in the voltage divider.

The invention and its advantages will be further explained with reference to the embodiment shown in the sole FIGURE of the accompanying drawing.

The signal lamps 1 and 2, shown in the FIGURE, of a traffic light arrangement are, for example, the green lights associated with intersecting flows of traffic or the green and the red light associated with one and the same traffic flow. To monitor the mutually excluding signal states of the signal lamps, these lamps 1 and 2 are connected via first terminals 3 and 4 to a first connecting terminal 5 of a supply source, not shown, for example the 220 Volt mains, as well as to a second connecting terminal 10 of the supply source via second terminals 6 and 7 and separate switches 8 and 9. Two diodes 11 and 12, which are arranged in the opposite sense and in series, are connected between the second terminal 6 and 7. Furthermore, a detection device 14 and a resistor 15 are connected between the junction 13 of the diodes 11 and 12 and the second connecting terminal 10 of the supply source. The detection device 14 comprises, for example, a light emitting diode 16 and a light-sensitive transistor 17.

The operation with a signal voltage, terminal 5 being positive relative to terminal 10, is as follows: If both switches are opened, a current flows from the first connecting terminal 5 via a signal lamp 1 and diode 11 and a current also flows via signal lamp 2 and diode 12 to the mutual junction 13 of the diodes 11 and 12. Via the light-emitting diode 16 and the current limiting resistor 15 these currents flow to the second connecting terminal 10. The valve of the resistor 15 has been chosen so that one of said currents excites the light emitting diode 16 sufficiently but is far below the value of the operating current of each of the signal lamps 1 and 2. As a result of the current flowing through diode 16 the conductivity of transistor 17 is increased. This high conductivity is detected by an alarm circuit, not shown, connected to the terminals 18 and 19. The alarm circuit does not give an alarm signal in the case of a high conductivity of the transistor 17.

If one of the switches, for example, switch 8, is closed signal lamp 1 is ignited by a current flowing through the first connecting terminal 5, the signal lamp 1, the switch 8 and the second connecting terminal 10. The voltage at the second connecting terminal 6 is then equal to the voltage at the second connecting terminal 10 so that diode 11 is cut off. Only the current which is supplied via the signal lamp 2 and the diode 12 now flows through the diode 16, which current sufficiently excites diode 16 and maintains the high conductivity state of transistor 17. If now, owing to a faulty switching operation switch 9 is closed or a short-circuit is produced in switch 9 during the time switch 8 is closed, the voltage at the second terminal 7 will also become equal to the voltage at the second connecting terminal 10. The signal path via diode 12 is then blocked and diode 16 does not carry current anymore. Consequently, transistor 17 is cut off and the conductivity state between the terminals 18 and 19 changes, which produces an alarm.

In the device described above the switch box containing the switching equipment for controlling the signal lamps is always arranged at some distance from these signal lamps and this equipment and the signal lamps are interconnected by means of cables. Leakage of these cables or of the switches 8 and 9 in the opened condition is unwanted. If this leakage is very large then the voltage drop produced by this leakage current across the signal lamps 1 and 2 is sufficiently large to cause the voltage at one or at both of the second connecting terminals 6 and 7 to decrease so far that an alarm is generated when the other switch closes. This is, however, the case only if these leakage currents approach the operating currents of the signal lamps 1 and 2.

To enable the detection of much lower values of the leakage currents the detection device is connected, in accordance with the invention, via a bias voltage source to the second connecting terminal of the supply source. In the embodiment shown in the FIGURE this bias voltage source comprises a voltage divider, including the resistor 15, a diode 20 and a Zener diode 21, connected between the connecting terminals of the supply voltage. The diode 20, whose pass direction corresponds to that of the diodes 11 and 12, could have been included anywhere in the voltage divider. The Zener diode, however, is included between the tapping point 22 of the voltage divider to which the detection device 14 is connected and the first connecting terminal of the supply source. The value of the Zener voltage of the diode 21 determines the voltage level that is allowed across the signal lamps 1 or 2 before the voltage at the second terminal 6 or 7 causes the diodes 11 or 12 to be cut off. As the voltage across the signal lamps 1 or 2 is determined by the values of the leakage currents in the cables, denoted in the FIGURE by $i_1$, a proper choice of the Zener voltage enables the detection of any value of the leakage current. A resistor can also be used instead of the Zener diode 21. The Zener diode has, however, the advantage that the size of the leakage current to be detected is independent of the voltage of the supply source.

What is claimed is:

1. A device for detecting unwanted signal combinations in a traffic light system comprising, first and second connecting terminals of an electric supply source, first and second traffic signal lamps each having first and second terminals, first and second switches, means connecting each signal lamp via the first terminal to said first connecting terminal of the supply source and via the second terminal and an individual one of said switches to the second connecting terminal of the supply source, two oppositely arranged series connected diodes connected between the second terminals of the signal lamps, and a detection device connected to a junction point formed between the interconnected terminals of the two diodes and coupled to the second connecting terminal of the supply source via a source of bias voltage.

2. A device as claimed in claim 1 wherein said two diodes are connected in the same pass direction relative to the first and second connecting terminals and the bias voltage source comprises a voltage divider connected between the first and second connecting terminals of the supply source and provided with a diode arranged in the same pass direction as said diodes, and means connecting the detection device to a tapping point on the voltage divider.

3. A device as claimed in claim 2 wherein the voltage divider further comprises a Zener diode connected between the tapping point and the first connecting terminal of the supply source and having a direction of conduction opposite to that of the diode included in the voltage divider.

4. A device as claimed in claim 1 wherein the detection device comprises a light-emitting diode.

5. A fail-safe circuit for preventing the simultaneous energization of a pair of signal lamps comprising, first and second supply terminals for connection to a source of supply voltage, first and second switches arranged to close in mutually exclusive time intervals, means connecting a first one of said lamps and said first switch in a first series circuit across said first and second supply terminals in the order named and the second one of said lamps and the second switch in a second series circuit across said first and second supply terminals in the order named and in parallel with the first series circuit, first and second diodes connected in series opposition between a junction point of said first lamp and the first switch and a junction point of the second lamp and the second switch, a detection device connected to a juncton point between said first and second diodes, and means coupling the detection device to the second supply terminal via a source of bias voltage that is independent of signal lamp current.

6. A circuit as claimed in claim 5 wherein said bias voltage source includes means for providing a DC voltage polarized in a direction that tends to reverse bias said first and second diodes.

7. A circuit as claimed in claim 5 wherein said bias voltage source comprises a voltage divider connected across said first and second supply terminals and having a tap point connected to said detection device.

8. A circuit as claimed in claim 7 wherein said voltage divider comprises a diode and a resistor connected in series circuit.

9. A circuit as claimed in claim 8 wherein said voltage divider further comprises a Zener diode connected between said tap point and the first supply terminal.

10. A circuit as claimed in claim 7 wherein said voltage divider comprises a diode and a resistor connected in series circuit and with said resistor included in said coupling means and connected in series with the detection device between the junction point of the first and second diodes and the second supply terminal.

* * * * *